United States Patent [19]

Sit

[11] Patent Number: 4,524,049

[45] Date of Patent: Jun. 18, 1985

[54] PROCESS FOR CONCURRENT STEAM GENERATION AND METAL RECOVERY

[75] Inventor: Song-P. Sit, Calgary, Canada

[73] Assignee: Zimpro Inc., Rothschild, Wis.

[21] Appl. No.: 528,269

[22] Filed: Aug. 31, 1983

[51] Int. Cl.$^3$ .................. C01G 31/02; C01G 53/00
[52] U.S. Cl. .................................... 423/65; 423/68;
423/140; 423/146; 423/150; 423/545; 75/101
R; 75/108; 75/115; 75/119; 75/121
[58] Field of Search .............. 423/68, 140, 146, 150,
423/65, 545; 75/120, 119, 121, 108, 115, 101 R

[56] References Cited

U.S. PATENT DOCUMENTS

| 1,513,200 | 10/1924 | Wdy | 423/68 |
|---|---|---|---|
| 1,540,154 | 6/1925 | Wittig | 423/68 |
| 1,570,170 | 1/1926 | Oberle | 423/68 |
| 2,588,265 | 3/1952 | McGauley | 75/119 |
| 2,824,058 | 2/1958 | Zimmermann | 210/761 |
| 3,042,489 | 7/1962 | Schoeffel | 23/167 |
| 3,649,534 | 3/1972 | Schotte | 210/63 |
| 3,840,637 | 10/1974 | Hardwick et al. | 423/68 |
| 3,870,631 | 3/1975 | Fassell | 210/63 |
| 4,389,378 | 6/1983 | McCorriston | 423/68 |

FOREIGN PATENT DOCUMENTS 819099  7/1969  Canada ............................. 196/39

OTHER PUBLICATIONS

Anon., "Fina Launches Petrochemical Vanadium", Canadian Petroleum, (p. 67), Sep. 1966.
L. A. Walker et al., "Potential for Recovering Vanadium from Athabaska Tar Sand", 26th Can. Chem. Eng. Conf., Toronto, Oct. 3-6, 1976.
Stemerowicz et al., "Recovery of Vanadium and Nickel from Athabaska Tar Sands Fly Ash", CIM Bulletin, (pp. 102–108), Apr. 1976.
T. R. Jack et al., "Leaching of Vanadium and Other Metals from Athabaska Oil Sands Coke and Coke Ash", Fuel 58, (p. 589), 1979.
P. J. Griffin et al., "Extraction of Vanadium from Oil Sands Fly Ash", in Waste Treatment and Utilization, Theory and Practice of Waste Management, vol. 2, Moo-Young et al., editors, Pergamon Press, (1981).
P. J. Griffin et al., "Extraction of Vanadium and Nickel from Athabaska Oil Sands Fly Ash", Second Int. Conf. on Heavy Crude and Tar Sands (UNITAR), 1981.

*Primary Examiner*—John Doll
*Assistant Examiner*—Robert L. Stoll
*Attorney, Agent, or Firm*—Allen H. Erickson; Thomas L. Johnson; B. Woodrow Wyatt

[57] ABSTRACT

Vanadium and nickel are recovered from fluid coke or fly ash concurrently with cogeneration of steam by a wet oxidation process at 500°–650° F. and elevated pressure, with a leaching pH of approximately 0.3 maintained by generation of sulfuric acid in situ. Vanadium products are precipitated by oxidation with for example sodium perchlorate with concurrent or subsequent pH adjustment to about pH 2. Following separation of the vanadium pentoxide, nickel powder is preferentially recovered by reduction with hydrogen and ammonia. Steam is generated by recovery of the thermal energy present in the offgases.

18 Claims, 2 Drawing Figures

PROCESS FOR CONCURRENT STEAM GENERATION AND METAL RECOVERY

BACKGROUND OF THE INVENTION

1. Field of the Invention

The present invention relates to concurrent and simultaneous steam generation and recovery of vanadium and nickel from fluid coke or flyash derived from the burning of fluid coke.

2. Information Disclosure Statement

In the conventional method of vanadium recovery and steam generation as described in Whigham Canadian Pat. No. 819,099 and in anonymous report entitled "Fina Launches Petrochemical Vanadium", in Canadium Petroleum, page 67, September 1966, fluid coke derived from thermal cracking of crude oil is first combusted with air in a steam boiler to generate process steam. Secondly, the hot and fine flyash must be collected in electrostatic precipitators. Thirdly, the collected flyash is slurried with sulfuric acid solution and subjected to a low pressure leach. The leached vanadium oxide is then oxidized to pentoxide. Finally, the pentoxide is precipitated by neutralizing part of the sulphuric acid.

This conventional process is found to be ineffective for vanadium recovery from fluid coke which is derived from oil sand bitumen. Recovery of vanadium is about 30–40 percent. This poor performance of vanadium recovery with the conventional method was well documented by L. A. Walker et al in "Potential for Recovering Vanadium from Athabasca Tar Sand", 26th Canadian Chemical Engineering Conference, Toronto, Oct. 3–6, 1976. This poor performance is attributed to vitrification or encapsulation of the vanadium compound in glassy alumina silicate material during the high temperature, ie, $\geqq 1600°$ F. combustion step. The alumina silicate compound is absent in conventional crude oil, but is present in the bitumen derived from oil sands. As described by Stemerowicz et al, "Recovery of Vanadium and Nickel from Athabasca Tar Sand Fly Ash", CIM Bulletin, pages 102–108, April 1976, micrographs of the resultant flyash invariably show glassy beads of non-porous material which effectively slow the infiltration and hence leaching action of sulphuric acid.

Three new processes have been suggested recently to circumvent the vitrification problems:

(1) as described by T. R. Jack et al, "Leaching of Vanadium and Other Metals from Athabasca Oil Sands Coke and Coke Ash", Fuel, 58, page 589, 1979, the coke can be leached directly with sulphuric acid;

(2) according to P. J. Griffin et al, "Extraction of Vanadium from Oil Sands Fly Ash", in "Waste Treatment and Utilization, Theory and Practice of Waste Management", Volume 2, Moo-Young et al, editors, Pergamon Press (1981) the collected fly ash can be roasted at 800°–900° C. (1470°–1660° F.) with a sodium salt, and the resultant molten salt is then cooled and subjected to NaOH leaching; the same authors also presented the concept in a paper entitled "Extraction of Vanadium and Nickel from Athabasca Oil Sands Fly Ash" at the Second International Conference on Heavy Crude and Tar Sands (UNITAR) 1981; and (3) the carbon in the flyash is separated by flotation and the ash is then smelted to form alloys of vanadium, nickel, iron and carbon, according to the Stemerowicz et al reference cited above.

The conventional process of vanadium recovery from flyash derived from regular crude oil suffers the following three disadvantages:

a. Fluid coke may contain sulphur at concentrations up to about 10 percent by weight. If the coke is burned in a conventional boiler, sulphur dioxide from the combination of sulphur and oxygen will be emitted with the boiler off-gas. Sulphur dioxide is a gaseous pollutant which must be removed to comply with pollution control regulations.

b. The flyash liberated during the combustion step is a fine powder (<325 mesh) at high temperature ($\geqq 1600°$ F.) Expensive equipment demanding high energy input, ie. electrostatic precipitators, are needed for 98% plus recovery. Uncollected flyash is also a recognized particulate pollutant if emitted to the atmosphere; such emissions are subject to regulatory controls.

c. Combustion of fluid coke in a steam boiler is generally inefficient in terms of carbon utilization; about 60% of the input carbonaceous material remains unburned in the flyash. If this carbonaceous material is permitted to go through the subsequent leaching step, it would unnecessarily take up process space. Furthermore, it would be lost with the unleachable ash waste, ie., loss of 60% of the available thermal energy contained in the coke.

The three recently proposed processes discussed above also have inherent disadvantages, as listed below:

1. Direct leach of fluid coke. Since only a minute quantity of vanadium is present in the fluid coke, a large amount of material has to be processed in large process vessels, resulting in high capital investment and low extraction efficiency. The rate of extraction is further decreased due to the low specific surface area of fluid coke. Following acid leaching, the carbonaceous material will be wet and must be dried before it can be combusted in steam boilers. This, of course, results in lower net steam output per unit of fluid coke, compared with the conventional process.

2. Roasting with sodium salt. This is an energy intensive process; a large amount of energy must be put into a process vessel in order to achieve fusion of flyash and the sodium salt. The fused material will also be low in porosity. Generally, the total specific surface area of non-porous materials is much lower than that of porous material. The rate of leaching is normally governed by the surface area available to the leaching agent. A lower specific surface area will result in a slower rate of metal extraction. As a result, residence time has to be increased, resulting in larger process vessels for the same percentage of recovery. Furthermore, the leaching solution (sodium hydroxide) is non-indigenous to the process and must be supplied from outside, necessitating storage and transportation systems.

3. Smelting to form ferro-alloys. This is also an energy-intensive process. Furthermore, it suffers from low percentage of recovery, ie, <60%, and the alloy product requires extensive further processing and refining to product marketable products, ie., ferrovanadium and ferronickel alloys.

The present invention is an integral and simultaneous steam generation and metal (vanadium and nickel) recovery process, which eliminates or minimizes gaseous and particulate pollutants. One step of the process consists of wet oxidation, a method commonly used for disposal of sewage sludges, paper mill sludges and chemical/petrochemical wastes. Wet oxidation of such materials is shown for example in Zimmermann U.S. Pat. No. 2,824,058.

Production of sulphuric acid from elemental sulphur by wet oxidation is shown by Schoeffel U.S. Pat. No. 3,042,489.

In Schotte U.S. Pat. No. 3,649,534, the dewaterability of waste activated sludge is shown to be enhanced by wet oxidation of the sludge following acidification to pH 2–5.

Fassell et al U.S. Pat. No. 3,870,631 discloses the acidification of combustible organic matter, in particular sludge, sewage or the like, to pH 1.5–7.0 for the purpose of accelerating the combustion rate in a wet oxidation system.

When applied to ore processing, the wet oxidation process comprises pressure oxidation leaching under conditions such that comsiderable oxidation of oxidizable matter takes place. McGauley U.S. Pat. No. 2,588,265 shows an oxidative pressure leaching of nickel-bearing ore at 275°–750° F. and at a pH less than about 3.0.

SUMMARY OF THE INVENTION

Fluid coke or fly ash containing vanadium, nickel, carbon and sulphur is slurried in water and treated in a high pressure wet oxidation reactor, wherein carbon and sulphur are oxidized and the metals (V, Ni) are solubilized. The reactor off-gas at elevated pressures and temperatures can be utilized to generate process steam via a heat exchanger. Slurry withdrawn from the reactor is filtered to remove undissolved material, which is neutralized before being sent to waste disposal. The liquor from the filtration is chemically oxidized and its pH adjusted to precipitate vanadium pentoxide hydrates which are then recovered by a second filtration. The liquor can be reacted with gaseous hydrogen and ammonia to precipitate nickel, which is recovered by filtration. The ammonium sulphate may be recovered by evaporation or other means.

The basic steps of the process comprise:
(a) slurrying the feed material, ie, fluid coke or fly ash in water and subjecting the slurried material to elevated temperature and pressure in the presence of oxygen in a wet oxidation reactor to generate, in situ, a liquor containing sulphuric acid and soluble compounds of vanadium and nickel, and simultaneously produce heat for co-generation of steam;
(b) removing suspended solids from the liquor;
(c) sequentially precipitating, removing and recovering vanadium and nickel products in concentrated form from the liquor; and
(d) recovering energy from the reactor off-gases by heat exchange to produce steam, thereby cooling the off-gases.

DETAILED DESCRIPTION INCLUSIVE OF PREFERRED EMBODIMENTS

While this invention may be applied to any raw material containing vanadium and nickel in combination with carbon and sulphur, it is particularly applicable for certain fluid cokes which contain the metals at concentrations suitable for economic recovery, contain sulphur at relatively high concentrations, and are subject to vitrification at conventional furnace temperatures.

The process of this invention has eight distinct characteristics which make it superior to the conventional process as well as the more recently proposed recovery processes:

1. The solid feed is oxidized in the liquid phase at relatively low temperatures (typically less than 650° F.). Vitrification of alumina and entrapment of vanadium and nickel will not take place at this comparatively low temperature (cf. 1600° F.).
2. Sulphuric acid is generated simultaneously in situ from the oxidation of sulphur, which can originate from the material containing the vanadium and nickel, or can be added to the slurry from an extraneous source, obviating acid manufacturing, handling, and storage systems.
3. The process operates at elevated pressures (>1000 psig) and temperatures (500°–650° F.) which facilitate impregnation of vanadium and nickel bearing material by sulphuric acid, and more efficient solubilization of the two metals, when compared with the conditions (1 atmosphere and 160° F.) of the conventional process.
4. Since oxidation is carried out in the liquid phase, heat of reaction directly evaporates water to form steam, concurrently with the solubilization of vanadium and nickel in a single reactor.
5. There is no emission of gaseous sulphur pollutants, because all of the sulphur is oxidized to sulphuric acid in situ obviating expensive scrubbing systems.
6. There is little or no emission of particulate pollutants; ash material is rendered neutral and innocuous before disposal.
7. Substantially complete utilization of the carbonaceous material in the feed and recovery of the thermal energy contained in the carbonaceous and sulphur materials are achieved. Flyash from conventional combustion of fluid coke may contain up to 60 percent of the fuel value of fluid coke, indicating a very inefficient process. The instant invention results in much higher energy conversion, whether fluid coke or fly ash resulting therefrom is used as the fuel for the wet oxidation reactions.
8. The process results in production of high purity products, ie., vanadium pentoxide, nickel and ammonium sulphate, or nickel powder, which can be used without extensive subsequent refining procedures.

Figure 1:
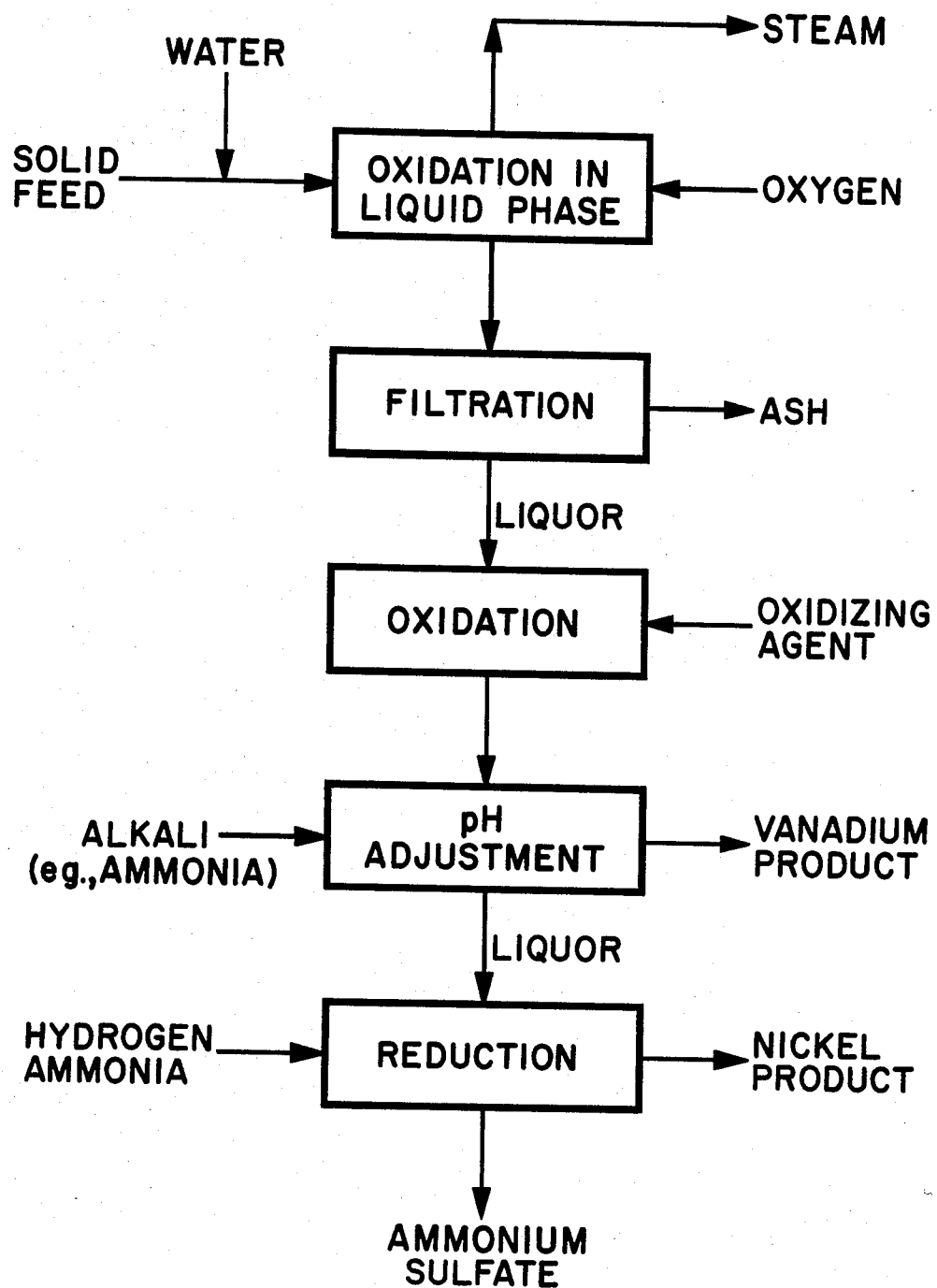
FIG. 1 is a process flowsheet showing the process steps of the present invention.

As shown in FIG. 1, solid feed comprising fluid coke or fly ash is subjected to liquid phase oxidation in the presence of water and oxygen. Offgases produced in the wet oxidation step contain thermal energy which is recovered by heat exchange to produce low pressure steam.

Following the removal of ash (suspended inert material) from the slurry from the reactor, vanadium product is precipitated and recovered by oxidizing it to the pentoxide state and adjusting the slurry pH.

Following separation of the vanadium pentoxide product, further pH adjustment and reduction results in formation of elemental nickel which is removed from the slurry.

The liquor from nickel recovery contains ammonium sulfate which may be recovered.

Figure 2:
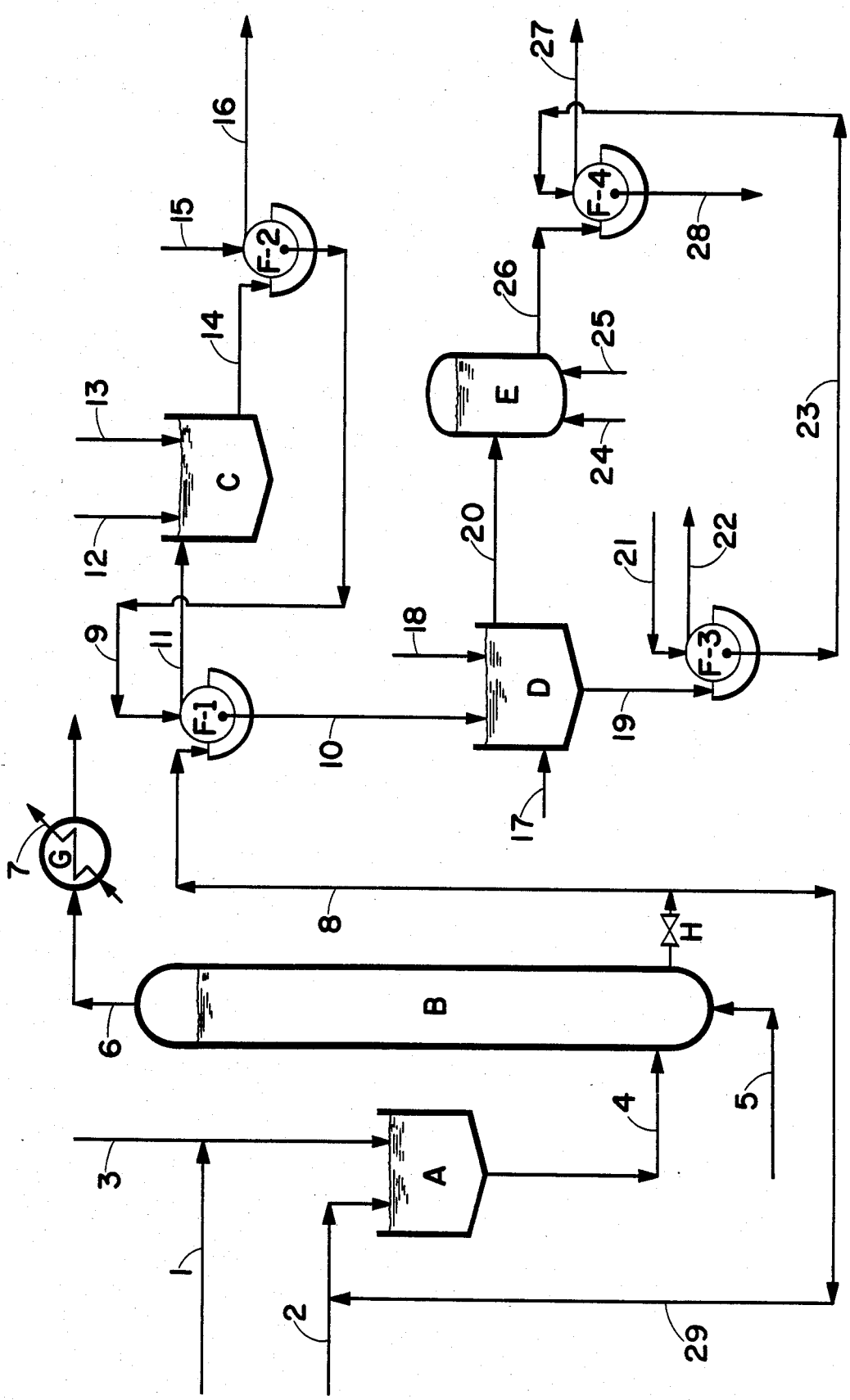
FIG. 2 is a flow diagram of a preferred embodiment of the invention.

Now turning to FIG. 2, feed material 1 containing carbon, sulphur and vanadium and nickel is slurried in water 2 in well-agitated slurry tank A. The feed material, for example fly ash or fluid coke, is of a particle size such that the slurry may be readily pumped through pipelines without undue solids deposition and clogging of pipes and other equipment.

The slurry 4 is transported by a high pressure pump from tank A to wet oxidation reactor B which is structurally and mechanically suitable for operation at elevated temperatures and pressures in an acidic environment. Typically, the reactor is operated at temperatures of 500°–650° F. and pressures of 1000–4000 psig. Oxygen 5, supplied as pure oxygen, air or a mixture of oxygen containing gases, is supplied to reactor B in order to oxidize the carbon and sulphur to generate heat and in situ sulfuric acid. Heat generated in the oxidation process evaporates some of the water as steam. The stream 6 of steam and inert gaseous combustion products, consisting primarily of carbon dioxide, are vented at reactor pressure and temperature to heat exchanger G for generation of steam 7 from boiler feed water. Alternately, stream 6 may be used directly as process steam, typically after pressure reduction.

Wet oxidation in reactor B converts reduced forms of sulphur to sulphuric acid. At pH less than 1.0, preferably less than pH 0.5, and more preferably about pH 0.2–0.4, compounds of vanadium and nickel are solubilized. While many carbonaceous raw materials 1 contain sufficient reduced sulphur to achieve pH 0.2–0.4, it is necessary to augment other raw materials with sulphur 3 in the form of elemental sulphur, sulphur dioxide, sulphur trioxide or sulphuric acid to obtain the desired pH. The sulphur compound is typically added to slurry tank A or to a stream leading thereto; the sulphur compound may be injected directly in the reactor if it is more convenient.

When the raw material contains insufficient carbon to generate the heat required in reactor B, a carbonaceous or hydrocarbon fuel may be added to the slurry to achieve the desired heat release. A specific ratio of sulphur:carbon:water in the slurry is provided to achieve the desired results. The particular ratio to be used is a function of at least the following factors:

(a) temperature of reactor
(b) reactor pressure
(c) fraction oxygen in oxidizing gas
(d) percent excess oxygen provided
(e) extraneous acid addition to slurry
(f) degree of oxidation
(g) chemical forms of sulphur in raw material
(h) chemical form of added sulphur
(i) controlled level of pH in reactor
(j) desired steam production rate In any case, substantially all of the sulphur is oxidized to sulphuric acid and substantially all of the carbon is oxidized to produce heat.

A slurry stream 8 containing solubilized nickel and vanadium and inert suspended solids is drawn off after suitable pressure let-down in in valve H, and routed to filter F-1. Optionally, a different solids removal device, for example a centrifuge, could be utilized. The flashed steam 29 resulting from pressure let-down at valve H may be recycled to the front end to preheat the feed slurry, thus conserving water and heat in the process. In an alternate arrangement, flashed steam 29 may be used to generate further steam or as a heat source for downstream process steps.

Filter cake 11 from filter F-1 is first washed and then reslurried in water 12 in tank C. An alkali agent 13 is then added to neutralize the slurry, which is drawn off as slurry underflow 14 to filter F-2.

Water 15 is used to wash the filter cake 16 which contains innocuous inorganic compounds. Filtrate 9 from filter F-2 is returned to filter F-1 as washing solution.

Filtrate liquor 10 from filter F-1 contains solubilized vanadium and nickel, and is treated in reactor D. An oxidizing agent 18 such as sodium perchlorate is added to oxidize the vanadium oxides to the pentoxide state. A caustic material 17, preferably ammonia, is then introduced to reactor D to adjust the liquor pH to facilitate precipitation, settling and concentration of vanadium pentoxide hydrates.

The underflow 19 from reactor D containing the concentrated vanadium pentoxide hydrate crystals together with a small portion of the liquor is filtered in filter F-3 to recover the vanadium product in filter cake 22. The filter cake 22 is washed with fresh water 21, and filtrate 23 is used as wash solution in filter F-4.

The overflow liquor 20 from reactor D contains nickel and ammonium sulphates which are marketable products. Liquid 20 may be further processed in autoclave E with hydrogen 24 and ammonia 25 at elevated temperature and pressure to precipitate nickel. The autoclave discharge liquor 26 containing precipitated nickel is dewatered on filter F-4 to produce a nickel-rich filter cake 27. Filtrate 28, which includes spent wash solution, contains ammonium sulphate which may be recovered for sale as a fertilizer.

EXAMPLE 1

This example illustrates the new process in the preferred embodiment of FIG. 2 for a reactor having a heat release of 100 million BTU per hour.

Fluid coke at about 130 lb per minute is slurried with fresh water in a well agitated tank A. The fluid coke has the following typical assays:

|  | Wt., % |
|---|---|
| Carbon | 70 to 80 |
| Sulphur | up to 7 |
| Ash | up to 10 |
| Nickel | 0.1 to 0.3 |
| Vanadium | 0.3 to 0.5 |

The solids content in the slurry is about 1 lb per U.S. gallon of solution which is fed to reactor B at about 130–140 U.S. gallons per minute. Compressed air is fed at a flowrate of about 18,000 scfm to the reactor. Elemental sulphur is added at a regulated flowrate to tank A so as to maintain a pH of about 0.3 in reactor B. The reactor is operated at 2000 to 3000 psig and 550° to 650° F. Oxidation of carbon and sulphur release heat according to reactions 1 and 2:

$$C + O_2 \rightarrow CO_2 + 169,000 \text{ BTU} \quad (1)$$

$$S + 3/2 O_2 + H_2O \rightarrow H_2SO_4 + 249,000 \text{ BTU} \quad (2)$$

This heat boils off some water in the reactor to generate steam. The off-gases (mainly steam, carbon dioxide, and nitrogen) are vented to a heat exchanger for process steam production. The process steam may be of any quality, but is preferably of 100% quality and at a minimum of 35 psig. The reactor B off-gas typically has the following composition:

|  | Vol. % |
|---|---|
| Steam | 60-70 |
| CO$_2$ + N$_2$ | 30-40 |

The sulphuric acid solubilizes vanadium oxides and forms nickel sulphate according to reaction (3);

$$NiO + H_2SO_4 \rightarrow NiSO_4 + H_2O \quad (3)$$

A slurry stream is drawn from the reactor and after proper pressure letdown through valve H is sent to filter F-1. Flash steam 29 is captured for recycle to the front end of the process. The filter cake contains the unsolubilized inorganic compounds such as alumina and silica. It is washed with recycled liquor from a downstream filter F-2 and sent to tank C to be reslurried in fresh water. Lime is added at about 0.3-0.4 lb. per minute to neutralize the acid content (inorganic and organic acids) in tank C. The neutralized slurry containing unsolubilized alumina and silica as well as calcium sulphate is sent to filter F-2 where the filter cake is further washed with fresh water and then sent to waste disposal. The filtrate liquor is recycled back to filter F-1.

The filtrate liquor from filter F-1 containing the solubilized vanadium and nickel oxides is now processed to recover the two metals. It is sent to a reactor D where sodium perchlorate is added at about 0.2 to 0.3 lb per minute to oxidize all vanadium oxides to the pentoxide state, at which point the liquor color changes from blue to yellow. Then ammonia at about 200-220 scfm is added to increase the solution pH from the existing pH of about 0.3 to a level of about pH 2, to enhance vanadium pentoxide hydrate precipitation. The underflow from reactor D is sent to filter F-3, where vanadium pentoxide hydrate is recovered as a 50% by weight (approximately) filter cake at about 1.5 to 1.8 lb per minute. The vanadium recovery is typically greater than 90%. The filtrate from this filter is sent to filter F-4 for washing the nickel concentrate.

The supernatant solution from reactor D contains nickel and ammonium sulphate which are marketable products. In the preferred embodiment, the metal is recovered as nickel powder by reacting with hydrogen and ammonia in autoclave E at elevated temperature (about 375° F.) and pressure (about 700 psig) according to reaction (4);

$$NiSO_4 + NH_3 + H_2 \rightarrow Ni + (NH_4)_2SO_4 \quad (4)$$

Hydrogen and ammonia are both supplied at 0.6 to 1.0 scfm each. The underflow from reactor E is filtered to recover a 50% by wt. nickel cake at about 0.15 to 0.2 lb per minute. Nickel recovery is greater than 60%. The ammonium sulphate may be recovered from the filtrate, using known techniques, and utilized for example as a fertilizer.

The embodiments of the invention in which an exclusive property or privilege is claimed are:

1. A process for concentrating and recovering vanadium and nickel from feed material which contains vanadium, nickel, carbon, and sulphur, comprising the steps of:
(a) slurrying said feed material in water and subjecting said material to temperatures of 500° F. to 650° F. and pressures of 1000 psig to 4000 psig in the presence of oxygen, while controlling the pH at a level of less than 1.0 in a wet oxidation reactor to generate, in situ, a liquor containing sulphuric acid and soluble compounds of vanadium and nickel, and simultaneously produce heat for co-generation of steam;
(b) removing suspended solids from said liquor;
(c) sequentially precipitating, removing and recovering vanadium and nickel products in concentrated form from said liquor; and
(d) cooling the reactor offgases.

2. The process according to claim 1, wherein said feed material is fluid coke.

3. The process according to claim 1, wherein said feed material is fly ash.

4. The process according to claim 1, wherein said feed material contains sulphides of vanadium and nickel which are oxidized to sulfates in said wet oxidation reactor.

5. The process according to claim 1, wherein said feed material contains oxides of vanadium and nickel.

6. The process according to claim 1, wherein extraneous elemental sulphur is slurried with said feed material in step (a).

7. The process according to claim 1, wherein extraneous carbonaceous materials are slurried with said feed material in step (a).

8. The process according to claim 1, wherein sulphuric acid is added to said water in which said feed material is slurried.

9. The process according to claim 1, comprising the further step of supplying sulphur dioxide and/or sulphur trioxide to said wet oxidation reactor as the source of sulphur.

10. The process according to claim 1, wherein the pH of said slurry within the reactor is controlled at a level between 0.2 and 0.4.

11. The process according to claim 1, wherein cooling of said reactor offgases comprises recovery of heat to generate process steam at 35 psig or greater pressure.

12. The process according to claim 1, wherein said oxygen containing gas is compressed air, molecular oxygen or a mixture thereof.

13. The process according to claim 1, wherein vanadium pentoxide hydrates are precipitated from said liquor in step (c) by the addition of sodium perchlorate as an oxidizing agent.

14. The process according to claim 13, comprising the further step of adding an alkali to the perchlorate-oxidized slurry to adjust the pH to about 2.0 and accelerate precipitation of vanadium oxide hydrates.

15. The process according to claim 14, wherein said alkali comprises ammonia.

16. A process for concurrent steam generation and the recovery of vanadium and nickel from fly ash, comprising the steps of:
(a) slurrying said fly ash and elemental sulphur in water and subjecting said slurry to temperatures of 500° to 650° F. and pressures of 1000 to 4000 psig in the presence of air or oxygen within a wet oxidation reactor;

(b) regulating the addition of elemental sulphur to said slurry of fly ash to result in a pH value of 0.2–0.3 within said reactor;

(c) discharging off-gases from the reactor at elevated pressure and temperature to a heat exchanger to generate steam;

(d) withdrawing oxidized slurry from said reactor and removing suspended solids therefrom by filtration to produce a filtrate containing vanadium and nickel compounds;

(e) adding sodium perchlorate to said filtrate to oxidize vanadium oxides to the pentoxide state;

(f) adding ammonia to oxidized filtrate to achieve pH about 2 to precipitate vanadium pentoxide; and (g) filtering precipitated vanadium pentoxide from ammonia adjusted oxidized filtrate.

17. The process according to claim 16, comprising the further steps of:

(h) subjecting the filtrate from step (g) to hydrogen and ammonia at a temperature of about 375° F. and elevated pressure of about 700 psig to precipitate nickel powder; and (i) recovering said nickel powder by filtration.

18. The process according to claim 17, further comprising the step of recovering ammonium sulphate from the filtrate from step (i).

* * * * *